US008447936B2

(12) United States Patent
Watkins et al.

(10) Patent No.: US 8,447,936 B2
(45) Date of Patent: May 21, 2013

(54) MODULE STATE MANAGEMENT IN A VIRTUAL MACHINE ENVIRONMENT

(75) Inventors: Douglas A. Watkins, Bellevue, WA (US); Idan Avraham, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 604 days.

(21) Appl. No.: 11/480,228

(22) Filed: Jun. 30, 2006

(65) Prior Publication Data

US 2008/0005489 A1    Jan. 3, 2008

(51) Int. Cl.
*G06F 12/00* (2006.01)

(52) U.S. Cl.
USPC ........... 711/153; 711/147; 711/152; 711/173; 711/200; 711/202; 711/203; 711/205; 711/206; 711/207; 711/209; 717/120; 709/213; 709/226

(58) Field of Classification Search .......... 711/152–153, 711/173, 200, 202–203, 205–207, 209; 709/213, 709/226; 717/120
See application file for complete search history.

(56) References Cited

U.S. PATENT DOCUMENTS

| | | | | |
|---|---|---|---|---|
| 5,600,805 A | | 2/1997 | Fredericks et al. | 395/825 |
| 5,873,120 A | * | 2/1999 | Harvey et al. | 711/173 |
| 6,279,046 B1 | * | 8/2001 | Armstrong et al. | 710/5 |
| 6,314,501 B1 | * | 11/2001 | Gulick et al. | 711/153 |
| 6,341,356 B1 | | 1/2002 | Johnson et al. | 714/4 |
| 6,438,671 B1 | | 8/2002 | Doing et al. | 711/173 |
| 6,629,162 B1 | | 9/2003 | Arndt et al. | 710/28 |
| 6,647,508 B2 | | 11/2003 | Zalewski et al. | 714/3 |
| 6,691,146 B1 | | 2/2004 | Armstrong et al. | |
| 6,973,510 B2 | | 12/2005 | Arndt et al. | 710/36 |
| 6,985,951 B2 | | 1/2006 | Kubala et al. | 709/226 |
| 7,613,847 B2 | * | 11/2009 | Kjos et al. | 710/22 |

(Continued)

FOREIGN PATENT DOCUMENTS

WO    WO2005036806 A2    4/2005

OTHER PUBLICATIONS

Barham, P.R., et al., "Xen 2002," *Technical Report*, University of Cambridge, Computer Laboratory, 2003, 553, 3-15.

(Continued)

*Primary Examiner* — Tuan Thai
*Assistant Examiner* — Zhuo Li
(74) *Attorney, Agent, or Firm* — Woodcock Washburn LLP

(57) ABSTRACT

A method for managing software modules of at least two operating systems sharing physical resources of a computing environment, but running in different partitions separated by a virtualization boundary comprises accumulating module information in a virtualization subsystem that directs the creation and management of the partitions. The accumulated module information is used across the virtualization boundary to manage the use of the software modules. Also, a method for managing software modules comprises making at least two operating systems aware that they are being hosted in a virtualized computing environment.

20 Claims, 9 Drawing Sheets

U.S. PATENT DOCUMENTS

| | | | |
|---|---|---|---|
| 2003/0037089 A1 | 2/2003 | Cota-Robles et al. | 709/1 |
| 2003/0037178 A1 | 2/2003 | Vessey et al. | 709/319 |
| 2003/0065676 A1 | 4/2003 | Gbadegesin et al. | 707/104.1 |
| 2004/0098544 A1* | 5/2004 | Gaither et al. | 711/154 |
| 2004/0215859 A1* | 10/2004 | Armstrong et al. | 710/200 |
| 2005/0086656 A1 | 4/2005 | Whitlock et al. | |
| 2005/0160151 A1 | 7/2005 | Rawson, III | 709/213 |
| 2005/0182788 A1* | 8/2005 | Arndt et al. | 707/103 R |
| 2006/0005190 A1 | 1/2006 | Vega et al. | |
| 2006/0155886 A1* | 7/2006 | da Silva et al. | 710/5 |
| 2007/0192518 A1* | 8/2007 | Rupanagunta et al. | 710/62 |
| 2008/0005488 A1 | 1/2008 | Watkins et al. | |
| 2008/0005489 A1 | 1/2008 | Watkins et al. | |

OTHER PUBLICATIONS

Bugnion, E., et al., "Disco: Running commodity operating systems on scalable multiprocessors," *ACM Transactions on Computer Systems*, 1997, 15(4), 412-447.

Villa, D., et al., "Profiling memory subsystem performance in an advanced Power virtualization environment," http://research.utep.edu/Portals/693/OSIHPA_UTEP_FinalSubmission.pdf, downloaded from the Internet on or about Apr. 18, 2006, 6 pages.

\* cited by examiner

US 8,447,936 B2

MODULE STATE MANAGEMENT IN A VIRTUAL MACHINE ENVIRONMENT

CROSS REFERENCE TO RELATED APPLICATIONS

This application is related to co-pending application entitled "MODULE STATE MANAGEMENT IN A VIRTUAL MACHINE ENVIRONMENT," U.S. application Ser. No. 11/479,228, filed on Jun. 30, 2006, which is hereby incorporated by reference in its entirety.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2006, Microsoft Corp.

BACKGROUND

A hypervisor is a layer of software positioned just above the hardware whose primary job is to direct the creation and management of partitions. Partitions are virtualization containers to which processor, memory, and device resources can be assigned. Software running within a partition is referred to as a guest.

Executable modules are built and packaged as structured files and contain the code and data necessary for their function. A section is the basic unit of code or data within a module. Sections have attributes that control access to the data in the section. The attributes that control read and write access to a section are dependent on the type data contained in the section. Code sections are typically write protected. Data sections can either be write enabled or write protected, depending on whether the data in the section is supposed to remain constant for the entire lifetime of the module.

Operating systems provide execution containers, each having their own virtual address space mapped on to the physical memory resources in the computer. The virtual address space is divided into fixed size pages.

Modules are loaded by mapping the contents of their sections into the pages of the virtual address space. The attributes of the sections are translated into attributes of the pages on which they are mapped based on the content of the section. Operating systems track the mappings of loaded modules for various reasons including, paging, physical resource sharing, and debugging.

Virtual memory managers utilize persistent storage devices to provide a repository for pages in the virtual address space that are not currently backed by the computer's physical random access memory (RAM) resources. Pages representing code sections are often write protected, as are pages representing some data sections, and are not paged to the backing store. Because the operating system tracks the modules that have been loaded in each address space, which may also include the individual properties of each segment in the module, the immutable sections can be reloaded from the module instead of the backing store when the pages representing those sections need to be accessed.

However, in a virtualized environment, operating systems running in separate partitions have no knowledge of the modules that are loaded in other partitions and therefore can not take advantage of the physical resource sharing opportunities that are available between multiple processes in a single partition.

Thus, needed are processes and a system that addresses the shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, module state management in a virtual machine environment is provided. For several embodiments, a method for managing software modules of at least two operating systems sharing physical resources of a computing environment, but running in different partitions separated by a virtualization boundary comprises accumulating module information in a virtualization subsystem that directs the creation and management of the partitions. The accumulated module information is used across the virtualization boundary to manage the use of the software modules.

Also, a method for managing software modules of at least two operating systems sharing physical resources of a computing environment, but running in different partitions separated by a virtualization boundary, the system comprises making the at least two operating systems aware that they are being hosted in a virtualized computing environment. Performance of at least one of the at least two operating systems is improved based on components of the at least one operating system taking advantage of the at least one operating system being aware that it is being hosted in a virtualized computing environment.

Below is a description of other advantages and features of the invention.

BRIEF DESCRIPTION OF THE DRAWINGS

Module state management in a virtual machine environment is further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Example Computing Devices

Figure 1:
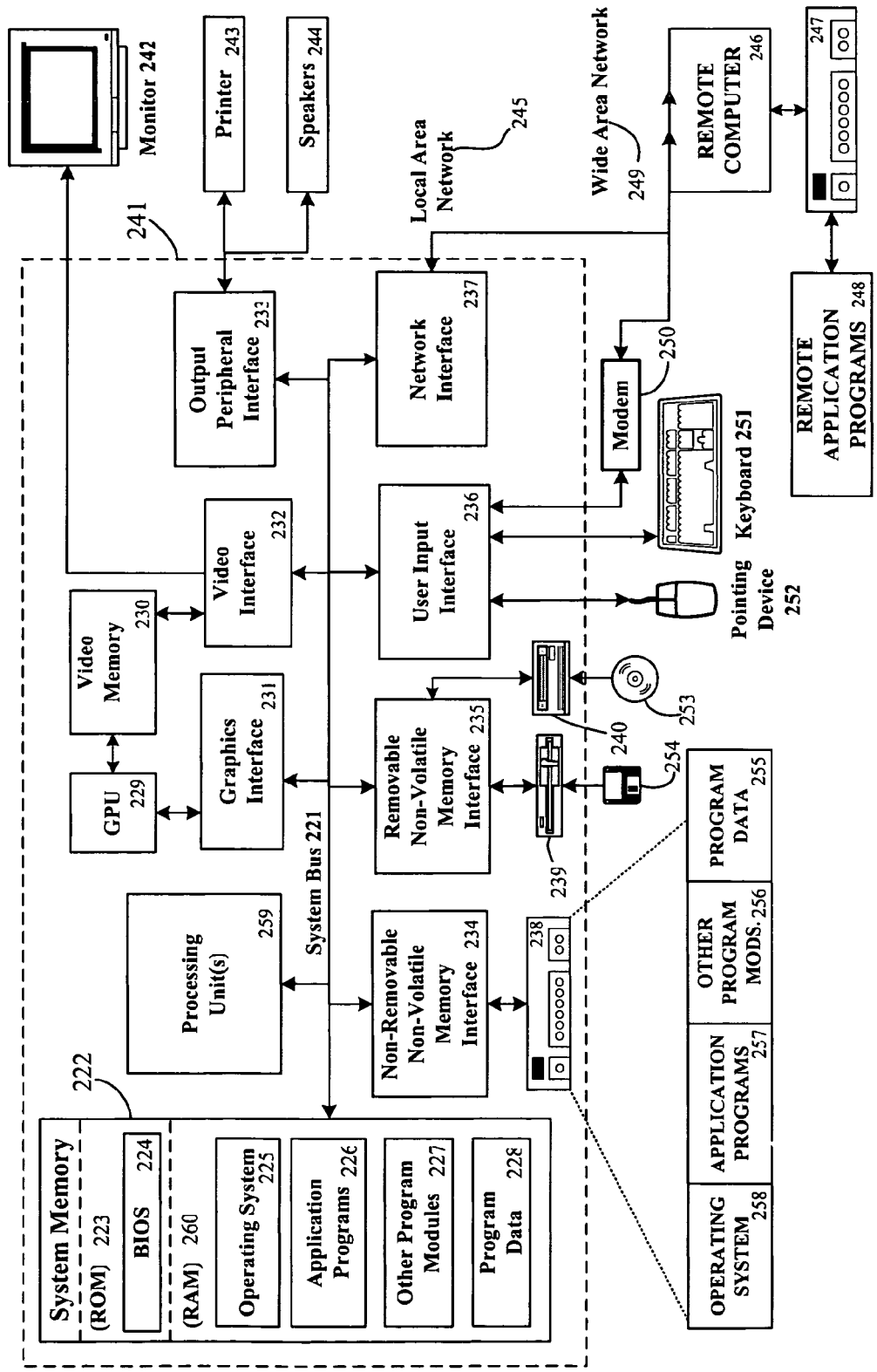
FIG. 1 is a block diagram representing an exemplary computing device suitable for use in conjunction with providing module state management in a virtual machine environment.

Referring to FIG. 1, shown is a block diagram representing an exemplary computing device suitable for use in conjunction with implementing the processes described above. For example, the computer executable instructions that carry out the processes and methods for module state management in a virtual machine environment may reside and/or be executed in such a computing environment as shown in FIG. 1. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220. For example a computer game console may also include those items such as those described below for use in conjunction with implementing the processes described above.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set-top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, the Peripheral Component Interconnect (PCI) bus also known as Mezzanine bus, as well as its successor, the PCI-Express standard.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1, provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as an insecure or secure video interface 232. An exemplary secure video standard would be the High-Definition Multimedia Interface (HDMI) standard. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the invention should not be limited to any single embodiment, but rather should be construed in breadth and scope in accordance with the appended claims.

Figure 2:
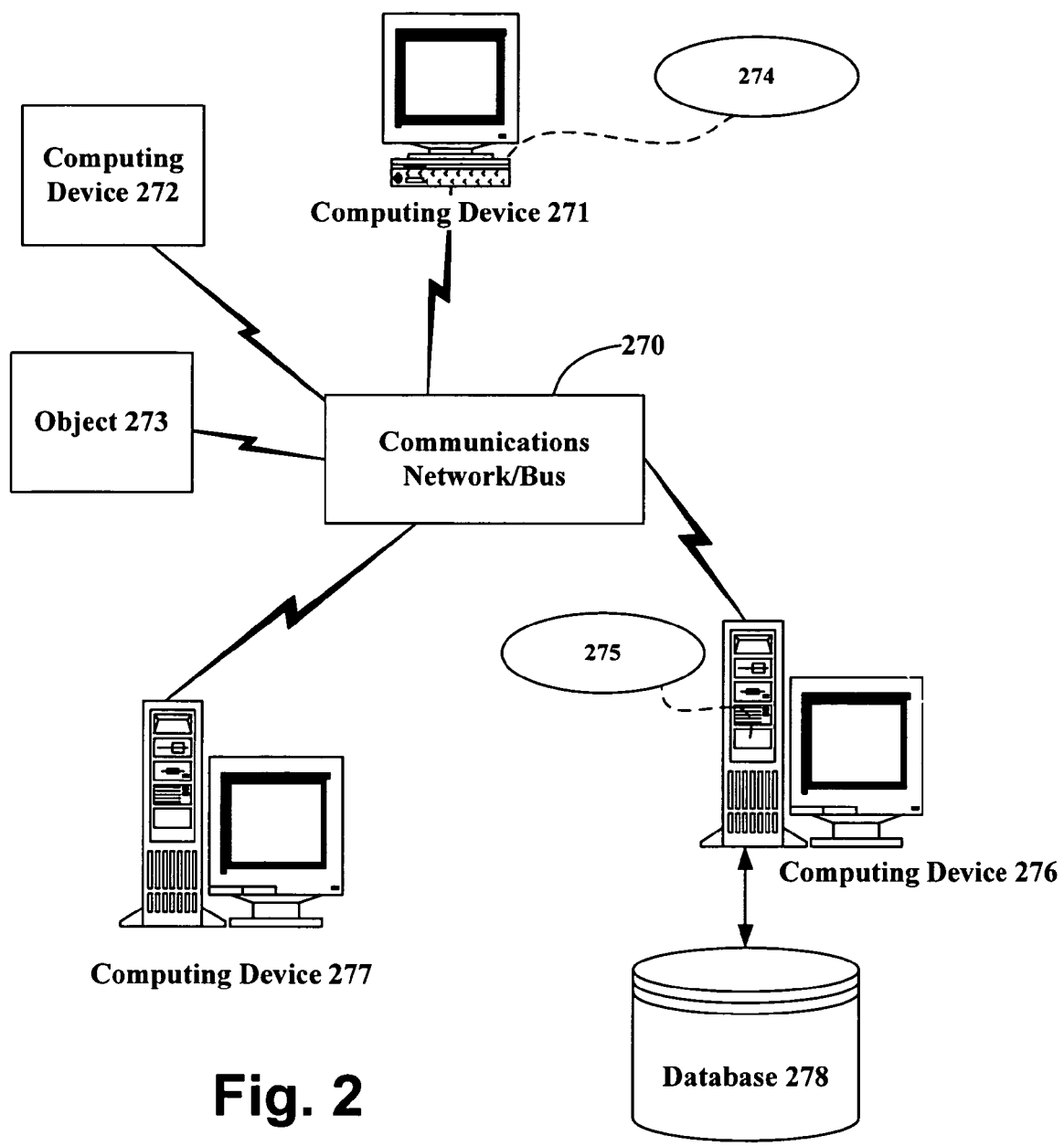
FIG. 2 illustrates an exemplary networked computing environment in which many computerized processes may be implemented to perform module state management in a virtual machine environment.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing module state management in a virtual machine environment. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the invention should not be limited to any single embodiment, but rather should be construed in breadth and scope in accordance with the appended claims.

Module State Management Across Virtualization Boundaries

Partitions completely isolate the state of a guest operating system (guest). There are typically multiple partitions running on a single physical machine hosted by the hypervisor. The state and location of loaded modules is tracked independently by the operating systems running in those partitions. The benefits that the operating systems derive from the module information they track for use in the management of the processes they host can be extended to other partitions by making hypervisor the central mediator of that information. The functionality and performance of an operating system running in a partition can be improved by making the operating system aware that it is being hosted in a virtualized environment. An operating system that has been modified to take advantage of the fact that it is running in a virtualized environment is known as an enlightened OS. Further description and utilization of such an OS and its components is provided below.

Figure 3:
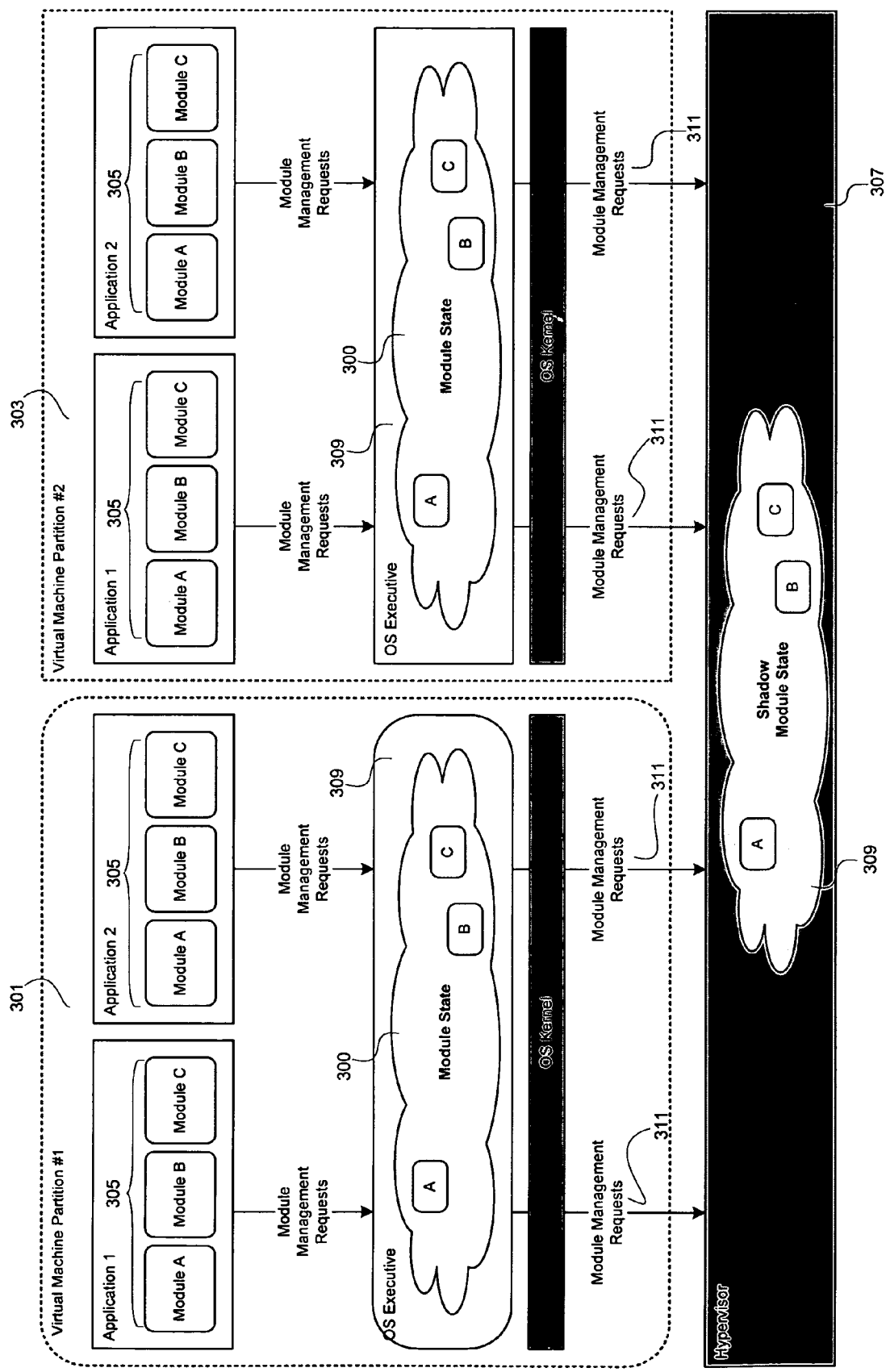
FIG. 3 is a block diagram illustrating an example system wherein module information can be shadowed in a virtualization subsystem and therefore made available to other partitions.

Referring next to FIG. 3, shown is a block diagram illustrating an example system wherein module information can be shadowed in a virtualization subsystem and therefore made available to other partitions. Module information 300 is leveraged across partitions 301 303 because events and properties associated with the loading and unloading of modules 305 is made available to the underlying virtualization subsystem 307 (i.e., the hypervisor).

The operating system components 309 that manage the loading and unloading of modules 305 can be enlightened in such a way that module load and unload events 311 are forwarded to the virtualization subsystem 307. The virtualization subsystem 307 notes the presence or absence of a module 305 by tracking the properties that uniquely identify the module 305 across partitions, which may include its uniform resource name, version, and digital signature.

Upon notification of a module related event 311, the hypervisor 307 may take responsibility for completing the steps required to prepare and load a module 305 into the partition 301 303. Alternatively, the hypervisor 307 may delegate the module 305 preparation and loading tasks back to the enlightened components 309 within the partition 301 303 that generated the event 311. In either case the hypervisor 307 maintains a consistent shadow copy 309 of the module information 300 for use across multiple partitions 301 303. Overall, in the example system shown in FIG. 3, the virtualization system processes the module load and unload requests 311. The state of all modules 305 from all partitions 301 303 is shadowed 309 in the virtualization subsystem 307.

Using Module State Information to Increase Physical Resource Sharing

Multiple copies of the same module can be loaded into different processes managed by an operating system. Rather than create two copies of the sections of the same module in the physical memory of the computer, the operating system creates two virtual address space mappings that are bound to a single copy of the module sections in physical memory. In a virtualized environment, operating systems running in separate partitions traditionally have had no knowledge of the modules that are loaded in other partitions and therefore can not take advantage of the physical resource sharing opportunities that are available between multiple processes in a single partition.

The virtualization subsystem virtualizes the physical address space of a partition. This additional layer of address translation allows each partition to have a zero-based, contiguous physical address space. The mapping of guest physical addresses (GPAs) to system physical addresses (SPAs) is transparent to the guest. When the hypervisor is made aware of the module state information, it can take advantage of the additional layer of physical address translation to share physical pages that contain the same data across multiple partitions.

Operating systems track the modules that have been loaded in each address space so that they can choose to duplicate the virtual address mappings for the pages representing the sections of the module without needing to duplicate the section data in physical memory. This technique is used on pages that represent both write protected and write enabled module sections. The mapping of mutable module sections is often accomplished with a copy on write paging strategy.

Figure 4:
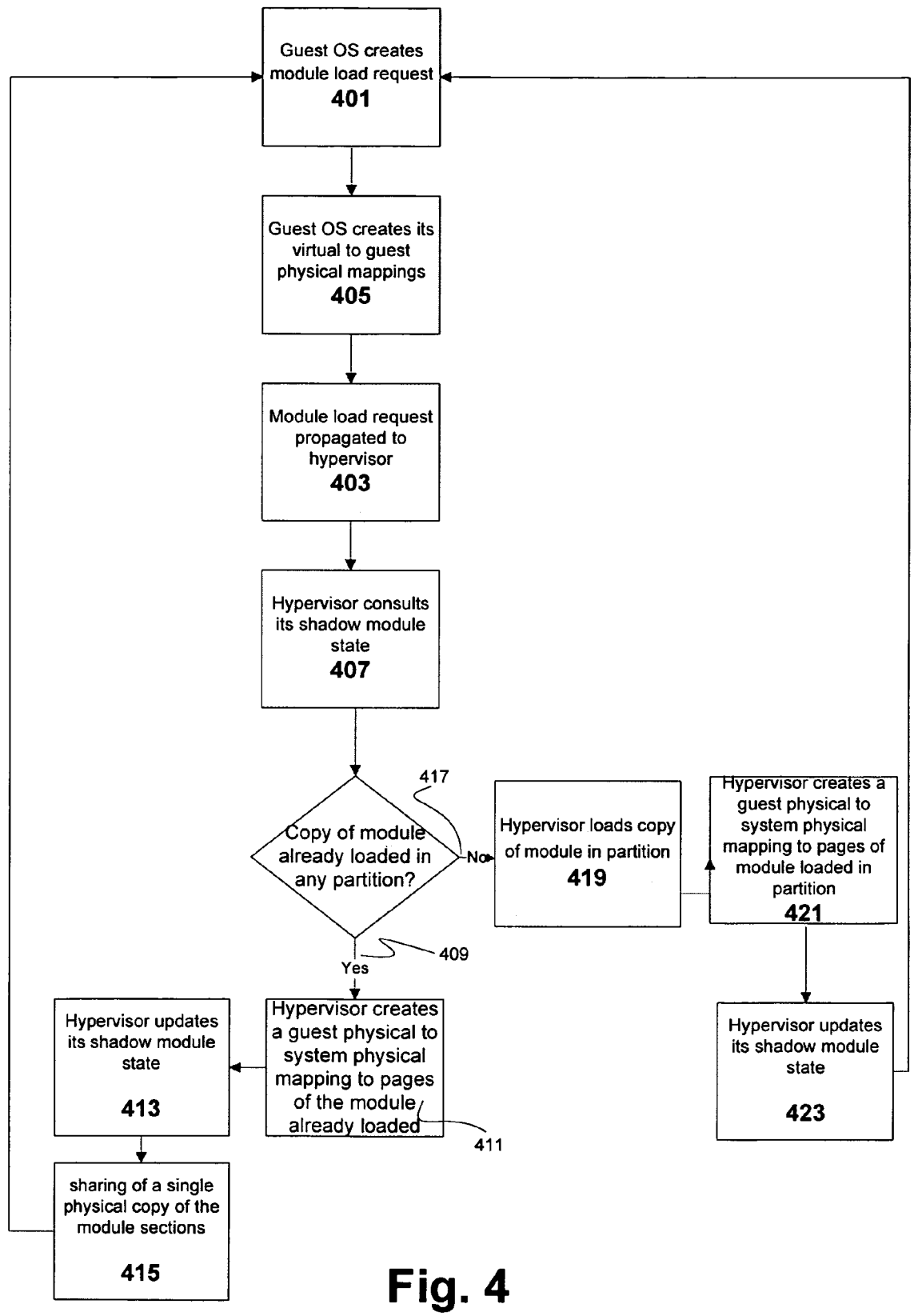
FIG. 4 is a flow diagram illustrating an example process for mapping a module into multiple virtual address spaces that share a single guest physical address mapping.

This technique can be extended in a virtualized environment by leveraging the additional layer of physical address translation. Referring next to FIG. 4, shown is a flow diagram illustrating an example process for mapping a module into multiple virtual address spaces that share a single guest physical address mapping. First, a guest operating system (guest OS) creates a module load request 401. The module load request is then propagated 403 to the hypervisor after the operating system has created its virtual to guest physical mappings 405. The hypervisor then consults its shadow module state 407. If a copy of that module had already been loaded 409 in any partition, the hypervisor creates 411 a guest physical to system physical mapping of the pages of the module already loaded and updates 413 its stored shadow module state accordingly. This results in the sharing 415 of a single physical copy of the module sections. If a copy of that module had not already been loaded 417 in any partition, the hypervisor loads 419 a copy of the module in the partition. The hypervisor then creates 421 a guest physical to system physical mapping of the pages of the module already loaded and updates 423 its stored shadow module state accordingly.

Figure 5:
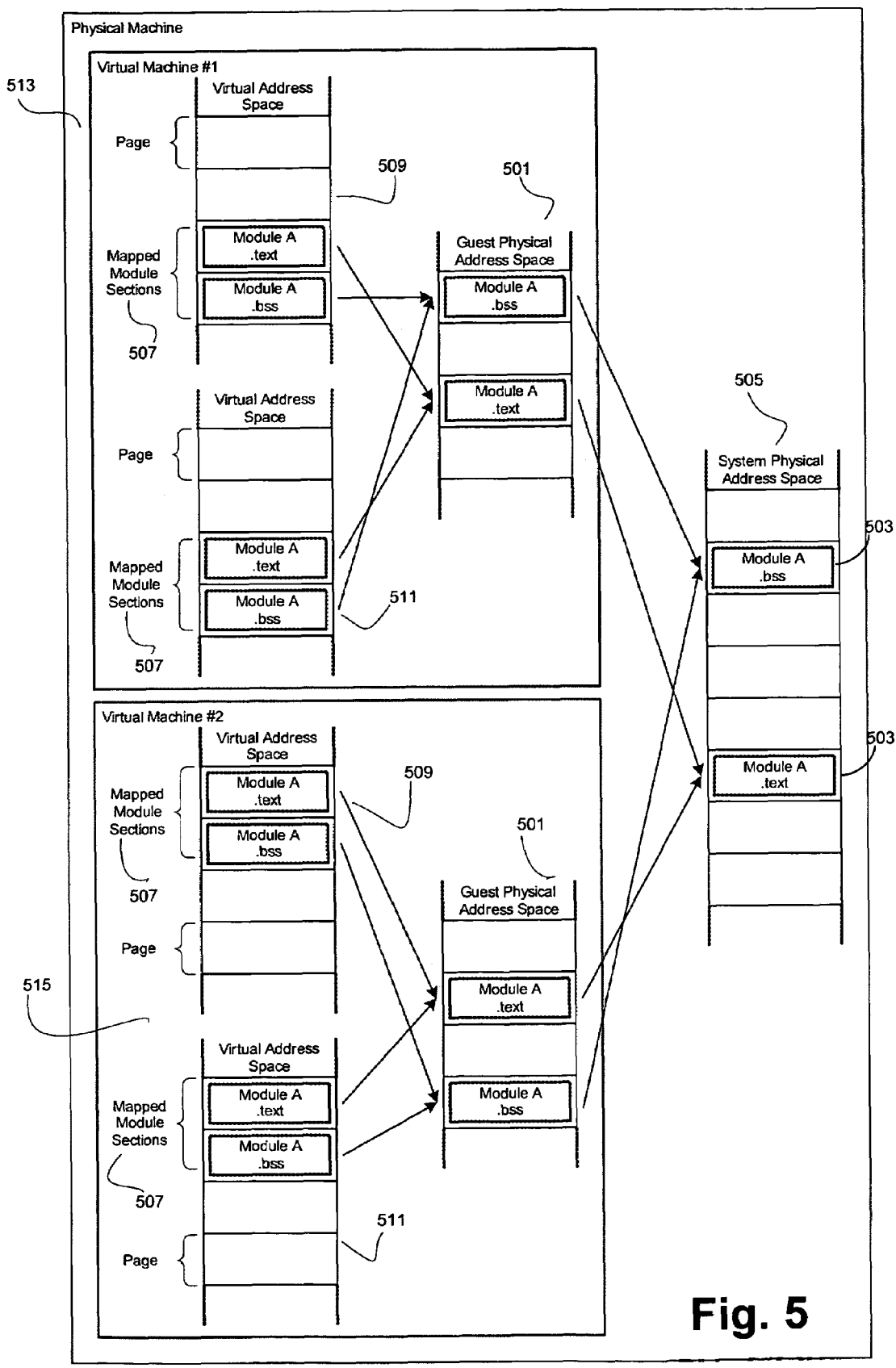
FIG. 5 is a block diagram illustrating an example system wherein a module can be mapped into multiple virtual address spaces that share a single guest physical address mapping.

Referring next to FIG. 5, shown is a block diagram illustrating an example system wherein a module can be mapped into multiple virtual address spaces that share a single guest physical address mapping. As can be seen in FIG. 5, guest physical address mappings 501 are ultimately associated with a single corresponding copy of the module data 503 in the system physical address space 505. In the example shown in FIG. 5, four instances of the same module 507 are loaded into two processes 509 511 in each of two partitions 513 515. There is only one copy 503 of the module section data in the system's physical memory 505.

Figure 6:
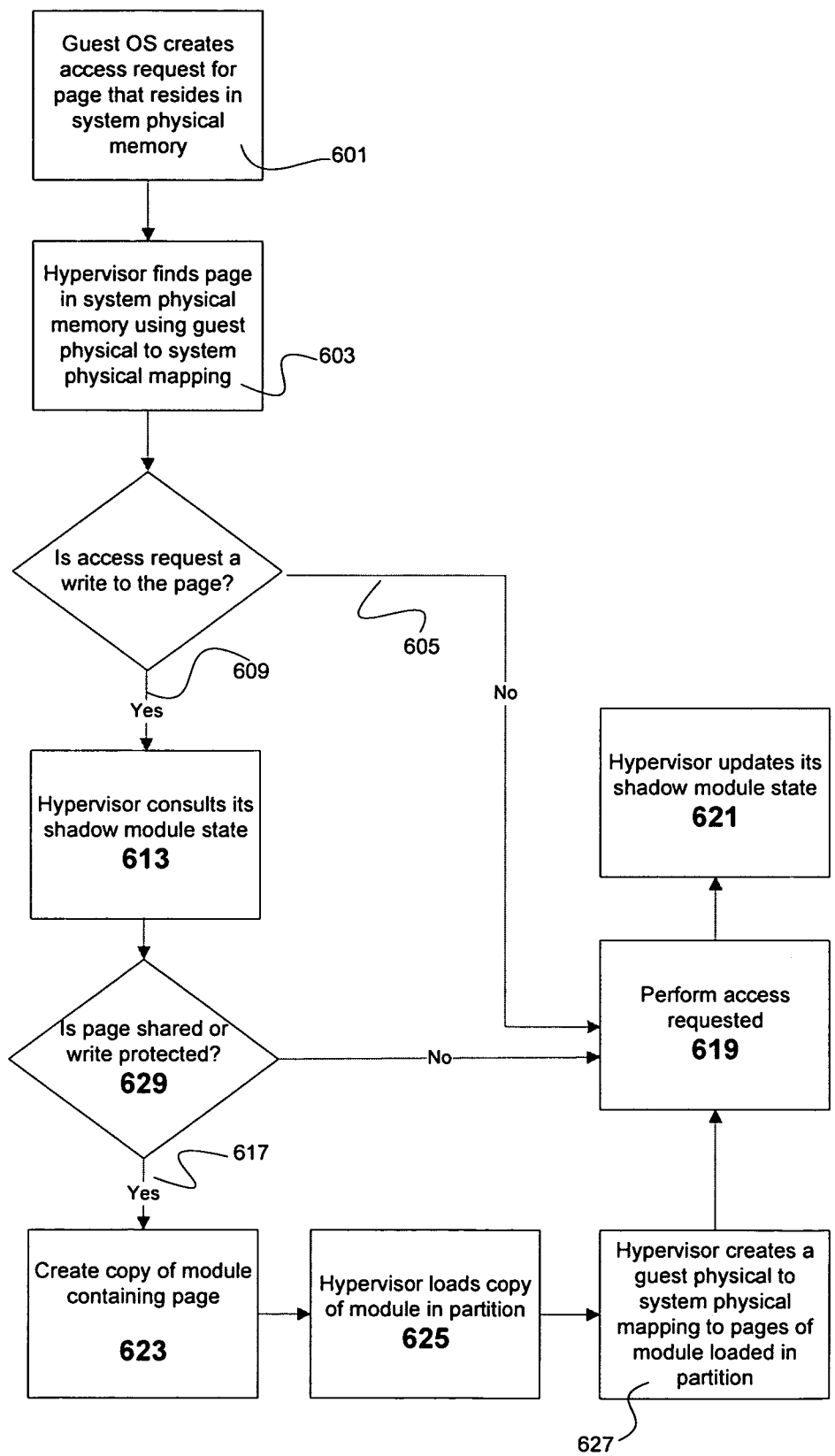
FIG. 6 is a flow diagram illustrating an example process for writing to a page within a module mapped into multiple virtual address spaces that share a single guest physical address mapping.

As mentioned earlier, the above technique is used on pages that represent both write protected and write enabled module sections. The mapping of mutable module sections is often accomplished with a copy on write paging strategy. An example of a process employing such a strategy is provided in FIG. 6. Shown in FIG. 6 is a flow diagram illustrating an example process for writing to a page within a module mapped into multiple virtual address spaces that share a single guest physical address mapping. First, a guest OS creates 601 an access request for page that resides in system physical memory. Next, the hypervisor finds 603 the page in system physical memory using guest physical to system physical mapping. If the access request is a write to the page 609, for example, then the hypervisor consults 613 its shadow module state to determine 629 whether the page is write protected or shared by another virtual machine. If the page is shared or write protected 617, then a copy of module containing the page is created 623. The hypervisor then loads 625 the copy of the module in the partition 625 and creates 627 a guest physical to system physical mapping to the pages within module loaded in the partition. The write can then be performed 619 on the copy. The hypervisor then updates 621 its shadow module state accordingly. If the access request is not a write to the page 605, or the page is neither write protected nor shared 615, then the requested access may be performed on the page 619 without making a copy. The hypervisor then updates 621 its shadow module state accordingly.

There are other techniques described below that would enable a hypervisor to coalesce physical pages via the physical address translation layer it introduces. Leveraging the module information from the hypervisor avoids an exhaustive search through the system physical address space looking for pages with the same data and page attributes.

Using Module State Information to Optimize Content Based Page Sharing and Paging Across Virtualization Boundaries In order to make better utilization of physical memory in a virtual machine environment, the virtualization subsystem uses a content based page sharing algorithm. When applying this algorithm, the virtualization subsystem scans the physical memory pages on the machine that are mapped into the various guest physical address spaces in order to identify pages with identical contents. When such pages are found, they are coalesced so that only one copy of the system physical page is used by several guest physical pages. The problem with this algorithm is that it is purely opportunistic and the virtualization subsystem doesn't know which physical pages have a higher likelihood of being shared by more than one guest.

Another memory technique employed by the virtualization subsystem is paging of guest physical memory. Using this technique, the guest is given the illusion that it is running on a physical machine with a certain amount of memory, while in reality the partition containing the guest OS consumes less machine physical memory. The virtualization subsystem may need to swap guest physical pages to/from persistent storage when certain pages are accessed by the guest. This technique enables running more partitions on a single physical machine because the overall amount of system physical memory consumed by the running guests is reduced. The main problem with this technique has to do with replacement policy. When the virtualization subsystem needs to write one of the guest physical pages to disk in order to make room for another page, it doesn't have an easy way of knowing which pages are good candidates for being swapped out to disk.

If two different guests load the same module into memory, then large portions of the system physical memory consumed by the module can be shared by the two partitions. Note that it is certainly possible that certain pages within the module can't be shared between the two partitions. This can happen if a subset of the module's guest physical pages has been paged out to disk by the guest. The opportunistic content based page sharing algorithm described above may eventually find the identical guest physical pages the module is mapped to and coalesce them such that only one set of system physical page is used. However, since the algorithm scans pages randomly, it may take time before the pages are found.

Figure 7:
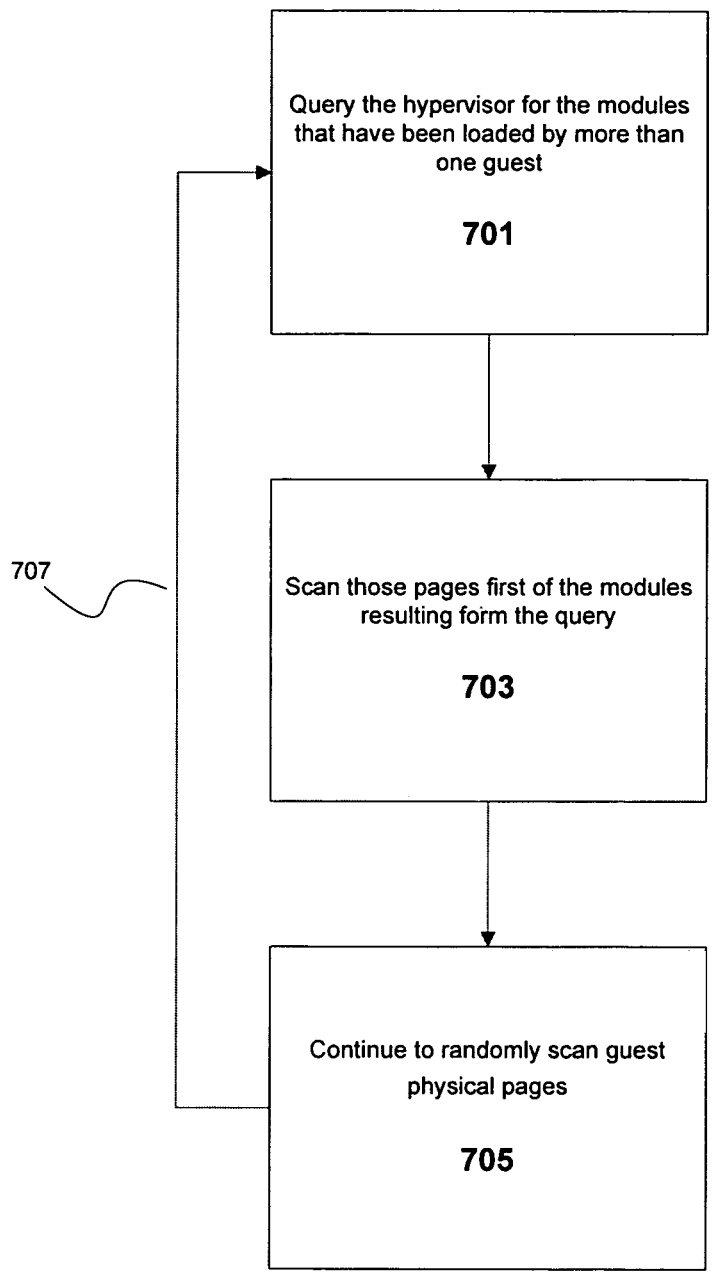
FIG. 7 is a flow diagram illustrating an example process for using module state information to optimize content based page sharing and paging across virtualization boundaries.

The module information stored in the hypervisor can be used for optimizing this opportunistic algorithm. The page sharing algorithm can use the module information in order to make better guesses as far as which portions of the guest physical address spaces are likely to have identical contents. Referring next to FIG. 7, shown is a flow diagram illustrating such an example process for using module state information to optimize content based page sharing and paging across virtualization boundaries. First, the process will query 701 the hypervisor for the modules that have been loaded by more than one guest. For those modules, the virtualization subsystem will use information such as the guest physical pages where the module resides. The guest physical pages the virtualization subsystem queried for are going to be scanned first 703 (because of the high likelihood to find pages with identical contents). Once those pages are scanned, the algorithm can fall back to randomly scanning 705 guest physical pages. This process should repeat 707 itself periodically, as modules are constantly loaded/unloaded within the guests. Another approach would be for the hypervisor to notify the virtualization subsystem whenever a module is loaded within the guest.

In addition to optimizing the opportunistic page sharing algorithm, the module information stored in the hypervisor can be used by the virtualization subsystem when applying replacement policy. When a guest physical page needs to be written to disk by the virtualization subsystem, it is important to choose a page that has a low likelihood to be accessed by the guest because the page will need to be paged-in if the guest tries to access it. The modules that are loaded by a large number of processes in a large number of guests have a high likelihood of being accessed. Common system components generally have that property (an example of such module in the Windows operating system is Kernel32.dll). Thus, when deciding which guest physical page should be paged-out to disk, pages that are not part of a loaded module should be considered first. Pages that are part of modules that are loaded by a large number of processes in a large number of guests should be considered last.

Using Module State Information to Ensure Specific Module Usage Across Virtualization Boundaries Modules often exhibit undesirable behavior in the form of bugs and potential security exploits. Updated modules are released periodically and it is incumbent on system administrators to insure that those updates get deployed uniformly across all affected systems.

Figure 8:
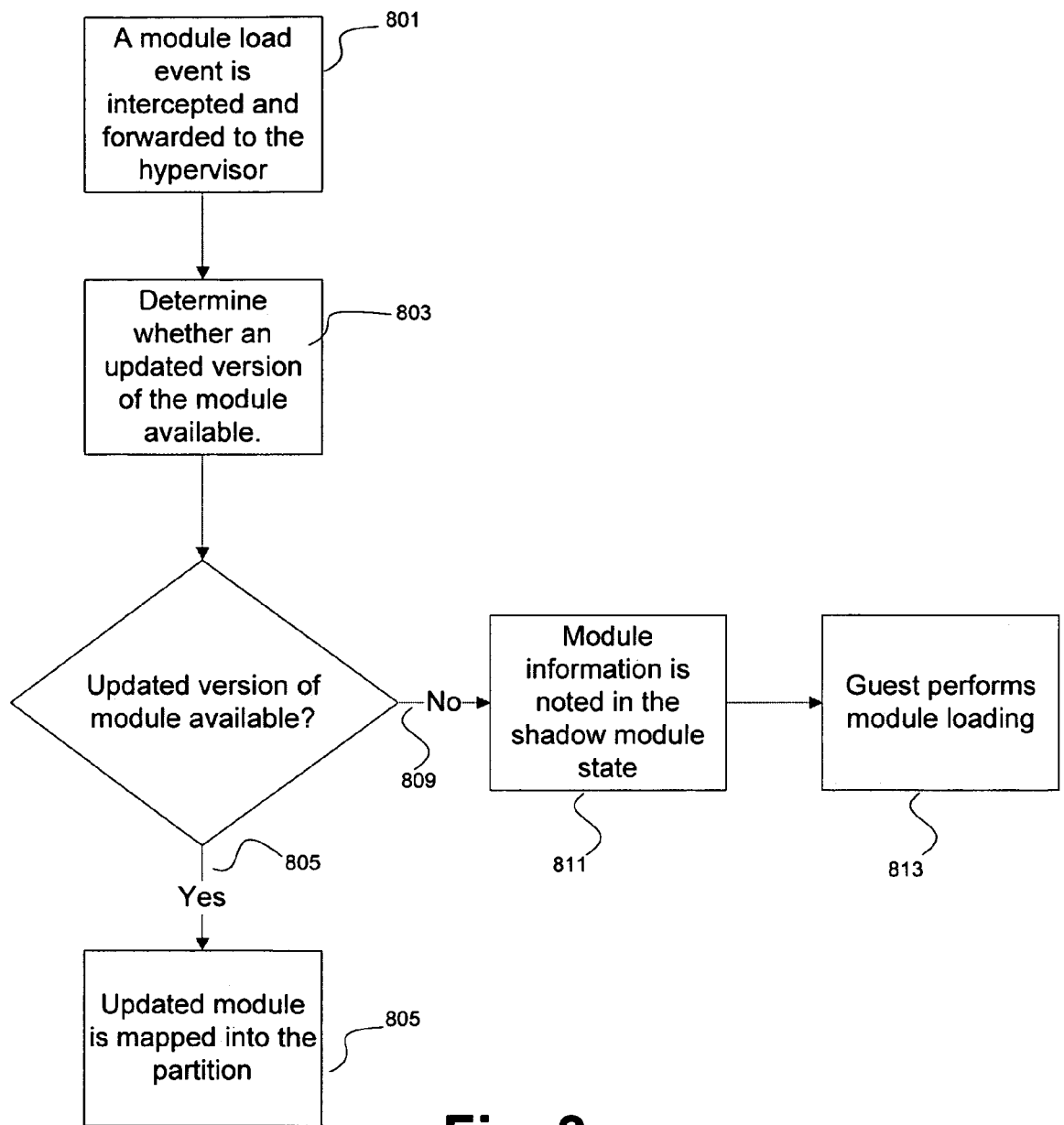
FIG. 8 is a flow diagram illustrating an example process for using module state information to ensure specific module usage across virtualization boundaries.

In order to address this issue, referring next to FIG. 8, shown is a flow diagram illustrating an example process for using module state information to ensure specific module usage across virtualization boundaries. Module load requests are intercepted 801 by the hypervisor as described above. In addition to the module state, the hypervisor would also have access to a module repository which would contain a mapping between the unique identifying information of the modules in need of updates and uniform resource identifiers that can be used to locate a copy of the updated modules.

As shown, a module load event is intercepted 801 and forwarded to the hypervisor before the sections are mapped into the guest physical address space. This action preempts the normal module loading process in the guest. The hypervisor consults the module repository and determines 803 whether an updated version of the module is available. If one exists 805 then the updated module is mapped 807 into the partition and the module loading mechanism in the guest is bypassed. If no substitute module exists 809, the module information is noted in the shadow module state 811 and the remainder of the module loading process is delegated 813 back to the guest.

Figure 9:
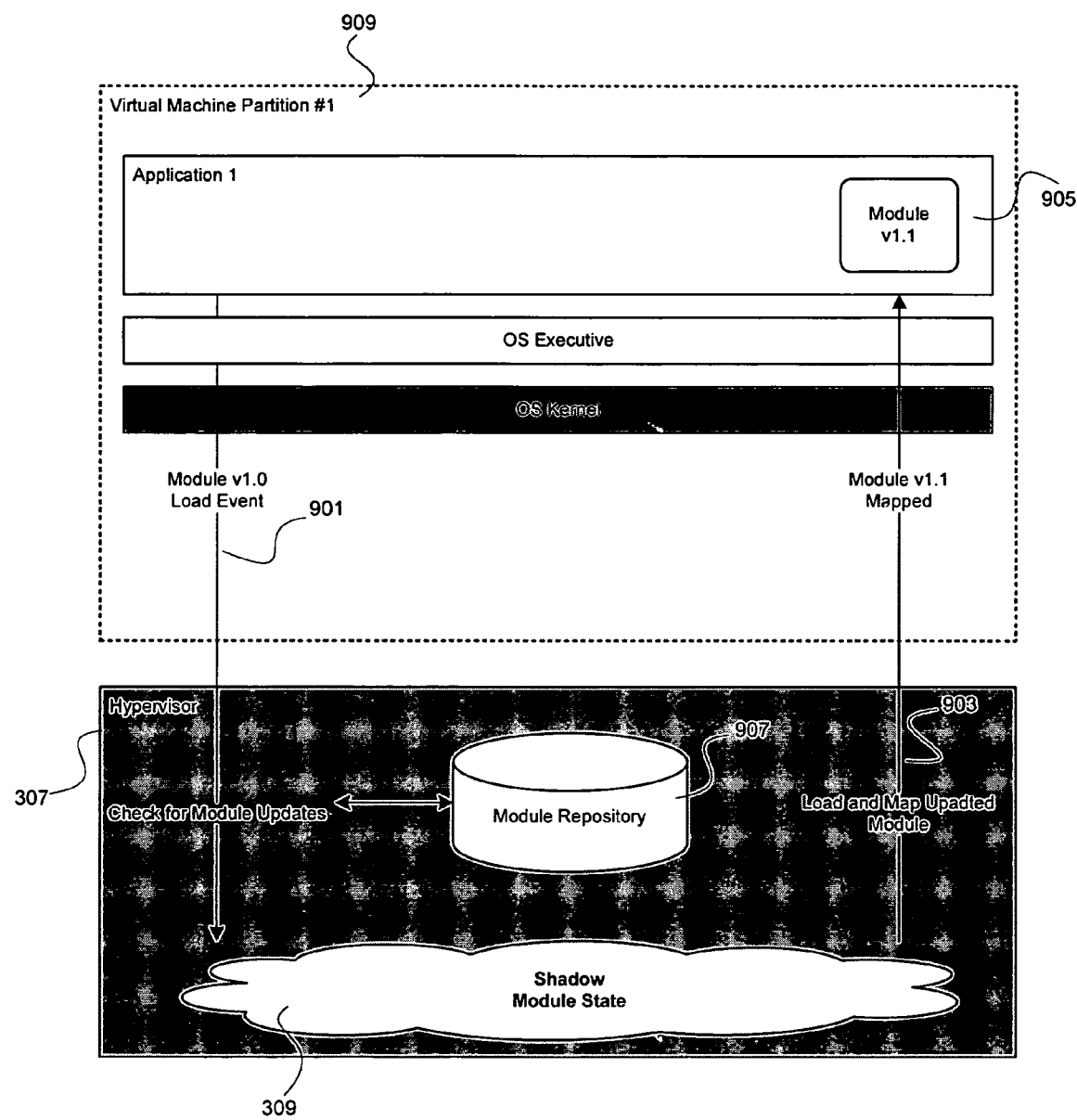
FIG. 9 is a block diagram illustrating an example system wherein a request for loading v1.0 of a particular module would be intercepted and overridden in the hypervisor.

Referring next to FIG. 9, shown is a block diagram illustrating an example system wherein a request 901 for loading v1.0 of a particular module would be intercepted and overridden in the hypervisor 307. Shown is a virtual machine partition managed by a hypervisor 307. In this case, the hypervisor 307 determined, by checking the module repository 907 that an updated version of the module 905, v1.1, was available and subsequently mapped 903 the updated version of the module 905 into the guest partition 909.

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. Furthermore, it should be emphasized that a variety of computer platforms, including handheld device operating systems and other application-specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A method for sharing pages across at least two operating systems sharing physical resources of a computing environment, but running in different partitions separated by a virtualization boundary comprising:
    creating a guest physical address space in each of the different partitions;
    maintaining module information in a virtualization subsystem that manages the different partitions, the module information indicating storing of at least a portion of a module into a physical memory resource, the maintaining module information comprising determining that at least one of the at least two operating systems has loaded a module and identifying a portion of the module with identical contents in a different partition; and
    based on the module information in the virtualization subsystem, sharing the physical memory resource containing the at least a portion of the module between the at least two operating systems and across the virtualization boundary by mapping between the guest physical address space and the system physical address space so that the at the least two operating systems can share the at least a portion of the module.

2. The method of claim 1, comprises:
    based on the module information in the virtualization subsystem, paging a page of the module across the virtualization boundary.

3. The method of claim 1 wherein maintaining further comprises:
    querying for modules that have been loaded by more than one of the at least two operating systems; and
    scanning physical pages of the module resulting from the querying to identify pages of the module with identical contents in different partitions.

4. The method of claim 3, wherein maintaining further comprises:
    randomly scanning physical pages of the at least two operating systems in order to identify pages with identical contents after the said scanning physical pages of the module resulting from the querying.

5. The method of claim 1, wherein sharing comprises:
    based on the accumulated module information in the virtualization subsystem, paging the identified pages with identical contents across the virtualization boundary.

6. The method of claim 1, wherein the virtualization subsystem maintains a consistent copy of the module.

7. The method of claim 1, wherein a copy of the module is loaded responsive to a write request.

8. A computer readable storage memory, having stored thereon computer executable instructions that, upon execution by a computing device, cause the memory to at least:
    create a guest physical address space in each of the different partitions;
    maintain module information in a virtualization subsystem that manages the different partitions, the module information indicating storing of at least a portion of a module into a physical memory resource, further comprising determining that at least one of the at least two operating systems has loaded a module and identifying a portion of the module with identical contents in a different partition; and
    based on the module information in the virtualization subsystem, share the physical memory resource containing the at least a portion of the module between the at least two operating systems and across the virtualization boundary by mapping between the guest physical address space and the system physical address space so that the at the least two operating systems can share the at least a portion of the module.

9. The computer readable storage memory of claim 8, having stored thereon further computer executable instructions that, upon execution by a computing device, cause the memory to at least:
    based on the module information in the virtualization subsystem, page a page of the module across the virtualization boundary.

10. The computer readable storage memory of claim 8, having stored thereon further computer executable instructions that, upon execution by a computing device, cause the memory to at least:
    query for modules that have been loaded by more than one of the at least two operating systems; and scan physical pages of the module resulting from the query to identify pages of the module with identical contents in different partitions.

11. The computer readable storage memory of claim 10, having stored thereon further computer executable instructions that, upon execution by a computing device, cause the memory to at least:
    randomly scan physical pages of the at least two operating systems in order to identify pages with identical contents after the said scan of physical pages of the module resulting from the querying.

12. The computer readable storage memory of claim 8, having stored thereon further computer executable instructions that, upon execution by a computing device, cause the memory to at least:
    based on the accumulated module information in the virtualization subsystem, page the identified pages with identical contents across the virtualization boundary.

13. A system for sharing pages across at least two operating systems sharing physical resources of a computing environment, but running in different partitions separated by a virtualization boundary comprising:
    means for identifying a module that has been loaded by more than one of the at least two operating systems;
    means for identifying pages of the module having identical contents in different partitions;
    means for maintaining module information in the virtualization subsystem that manages the different partitions, the module information indicating storing of at least a portion of the module into a physical memory resource; and
    means for sharing the physical memory resource between the at least two operating systems by mapping between the guest physical address space and the system physical address space, based on the module information in the virtualization subsystem.

14. The system of claim 13, wherein the means for sharing further comprises:

means for paging a page of the module across the virtualization boundary, based on the module information in the virtualization subsystem.

15. The system of claim 13, wherein the means for maintaining further comprises:
means for randomly scanning physical pages of the at least two operating systems in order to identify pages with identical contents after the said scanning physical pages of the module resulting from the querying.

16. The system of claim 15, wherein means for sharing further comprises:
means for paging the identified pages with identical contents across the virtualization boundary, based on the accumulated module information in the virtualization subsystem.

17. A system for sharing pages across at least two operating systems sharing physical resources of a computing environment, but running in different partitions separated by a virtualization boundary comprising:
a processor;
a memory having a communication path with said processor and having stored therein:
a virtualization subsystem that manages the partitions, said the partitions isolating the state of their respective guest operating systems, said virtualization subsystem accumulating module information when executed by said processor, the module information indicating storing of at least a portion of a module into a physical memory resource; and
an optimizer configured to identify a page of the module with identical contents in the at least two operating systems and share the page between the at least two operating systems using the accumulated module information.

18. The system of claim 17 wherein the accumulated module information comprises properties that uniquely identify modules across the virtualization boundary.

19. The system of claim 17 wherein the virtualization subsystem comprises a hypervisor.

20. The system of claim 19 wherein at least one of the different partitions is a virtual machine partition.

* * * * *